United States Patent Office 3,189,637
Patented June 15, 1965

3,189,637
CYCLOALKENYL GLYCOL BORIC ACID ESTERS
Irving S. Bengelsdorf, Santa Ana, William G. Woods, Anaheim, and William David English, Orange, Calif., assignors to United States Borax & Chemical Corporation, Los Angeles, Calif., a corporation of Nevada
No Drawing. Filed May 24, 1962, Ser. No. 197,243
4 Claims. (Cl. 260—462)

The present invention relates as indicated to cycloalkenyl glycol boric acid esters, and has further reference to a method for preparing the same.

It is, therefore, the principal object of this invention to provide as new compounds the cycloalkenyl glycol boric acid esters and the cycloalkenyl glycol diborates.

It is a further object of the present invention to provide an efficient and economically desirable method for preparing the cycloalkenyl glycol boric acid esters.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises cycloalkenyl glycol boric acid esters of the formula RM where R is selected from the group consisting of unsaturated alicyclic groups, chlorine substituted unsaturated alicyclic groups, unsaturated bicyclic groups, and chlorine substituted unsaturated bicyclic groups, and M is selected from the group consisting of

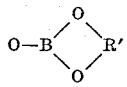

and

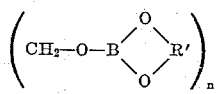

where R' is an alkylene radical of from 2 to 3 carbon atoms in length and containing a total of from 2 to 20 carbon atoms, and n is an integer of from 1 to 2.

The cycloalkenyl glycol boric acid esters of the present invention have been found to have numerous industrial applications. These compounds are important as intermediates in the preparation of organoboron polymers and other desirable organoboron compounds. They have utility as curing agents for epoxy resins, and have use in the production of resins, adhesives and coating compositions. They are also useful as fuel additives which increase the efficiency of internal combustion engines, as corrosion inhibitors for hydraulic systems, and as antigumming agents for lubricating oils and greases. In addition, the present compounds find utility as herbicides, fungicides and bacteriostatic agents, and the chlorine substituted compounds are excellent insecticides.

There are several methods available for preparing the present cycloalkenyl glycol boric acid esters. They can be prepared by treating an appropriate glycol with an applicable cycloalkenyl alcohol and boric acid or boron trioxide. In the preferred embodiment of the invention we prepare these compounds by the esterification of a glycol monoborate or a glycol boric acid ester with an applicable cycloalkenyl alcohol. This method can best be illustrated by the following equations:

(1)
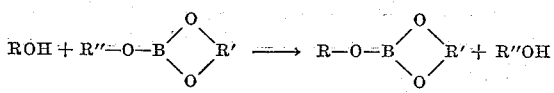

(2)
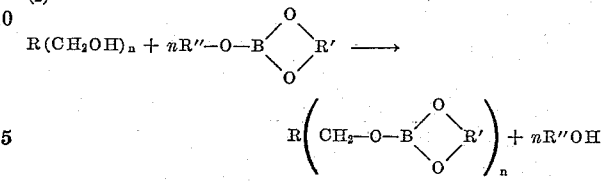

where R is an unsaturated alicyclic group, a chlorine substituted unsaturated alicyclic group, an unsaturated bicyclic group, or a chlorine substituted unsaturated bicyclic group, R' is an alkylene radical of from 2 to 3 carbon atoms in length and containing a total of from 2 to 20 carbon atoms, R" is hydrogen or an alkyl radical of from 1 to 6 carbon atoms, and n is an integer of from 1 to 2.

The above reactions will proceed when there is an excess of either reactant. Such excess, however, complicates the separation of the desired product from the reaction mass and results in lower yields of product. Therefore, for the sake of economy and ease of separation, in the preferred embodiment of the invention, we use stoichiometric amounts of the reactants.

The preferred method for performing the present reactions is a direct single-step process which involves admixing a glycol monoborate or glycol boric acid ester with an applicable cycloalkenyl alcohol in the presence of a hydrocarbon solvent which is inert to the reactants such as, for example, benzene, toluene, xylene, n-heptane, etc. The admixture is then heated under reflux to complete the reaction and the water or alcohol reaction product is removed by distillation. Any excess solvent is then removed from the remaining reaction mass by distillation and the desired cycloalkenyl glycol boric acid ester is recovered as the residue.

As regards the reactants applicable to the present invention, the first of these are the monohydric and dihydric cycloalkenyl alcohols having the formulas ROH and R(CH$_2$OH)$_n$, where R and n are as defined previously. The cycloalkenyl alcohols having the formula ROH are derived from the Diels-Alder reaction of a conjugated diene such as piperylene, cyclopentadiene, butadiene, hexachlorocyclopentadiene, etc., with an applicable dienophile such as vinyl acetate, and then hydrolyzing the reaction product to the desired alcohol. The cycloalkenyl alcohols having the formula R(CH$_2$OH)$_n$ are derived from the Diels-Alder reaction of the same conjugated dienes with an appropriate unsaturated alcohol such as allyl alcohol, crotyl alcohol, methylallyl alcohol, butenediol-1,4, etc. These cycloalkenyl alcohols and their preparation are well known in the art.

The following list is illustrative of the cycloalkenyl alcohols applicable to the present invention:

2-methyl-1,2,3,6-tetrahydro-benzyl alcohol
3-chloro-1,2,5,6-tetrahydro-benzyl alcohol
1,2,3,6-tetrahydrophenol
1,4,5,6,7,7 - hexachloro - 2,3-endo-di-(hydroxymethyl)bicyclo[2.2.1]hept-5-ene
2-endo-hydroxybicyclo[2.2.1]hept-5-ene
2-exo-endo-hydroxymethylbicyclo[2.2.1]hept-5-ene The second group of reactants applicable to the present invention are the glycol monoborates and the glycol boric acid esters having the formula

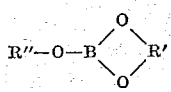

where R' is an alkylene radical of from 2 to 3 carbon atoms in length and containing a total of from 2 to 20 carbon atoms, and R'' is hydrogen or an alkyl radical of from 1 to 6 carbon atoms. These compounds are well known in the art and many of them are presently commercially available. The following list is illustrative of these compounds:

2-hydroxy-4,4,6-trimethyl-1,3,2-dioxaborinane
2-n-propoxy-4-propyl-5-ethyl-1,3,2-dioxaborinane
2-methoxy-4,5-dimethyl-1,3,2-dioxaborolane
2-hydroxy-4-methyl-1,3,2-dioxaborolane
2-ethoxy-4-methyl-1,3,2-dioxaborinane
2-isopropoxy-1,3,2-dioxaborolane
2-n-butoxy-1,3,2-dioxaborinane
2-n-pentoxy-4,5-dimethyl-1,3,2-dioxaborolane
2-methoxy-5-methyl-5-ethyl-1,3,2-dioxaborinane
2-n-butoxy-4-methyl-1,3,2-dioxaborolane
2-n-hexyloxy-4,4,6-trimethyl-1,3,2-dioxaborinane
2-ethoxy-4-propyl-5-ethyl-1,3,2-dioxaborinane It is to be clearly understood that the foregoing lists are only a partial enumeration of the compounds applicable as reactants to the present invention and are in no way intended to limit the invention.

So that the present invention can be more clearly understood, the following examples are given for illustrative purposes:

I. Into a 500 ml. round-bottomed flask equipped with a magnetic stirrer, a Dean-Stark trap, and a reflux condenser and containing 200 ml. of toluene was placed 24.8 grams (0.20 mole) of 2-exo-endo-hydroxymethylbicyclo[2.2.1]hept-5-ene and 28.8 grams (0.20 mole) of 2-hydroxy-4,4,6-trimethyl-1,3,2-dioxaborinane. The reaction mixture was heated under reflux in a nitrogen atmosphere for about 3 hours at which time the theoretical amount of water, 3.6 grams, had been removed. The toluene was then removed from the resultant reaction mass by distillation at reduced pressure and 47.7 grams (95.4% yield) of 2-exo-endo-[2'-(4',4',6'-trimethyl-1',3',2'-dioxaborinanyloxy)methyl]bicyclo[2.2.1]hept-5-ene, the desired cycloalkenyl glycol boric acid ester, was recovered from the reaction vessel. Chemical analysis of the product yielded the following datum.

Calculated for $C_{14}H_{23}BO_3$: B=4.33%. Found in product: B=4.42%.

II. Into a 500 ml. round-bottomed flask equipped with a magnetic stirrer and a reflux condenser and containing 200 ml. of xylene was placed 31.55 grams (0.25 mole) of 2-methyl-1,2,3,6-tetrahydro benzyl alcohol and 46.52 grams (0.25 mole) of 2-isopropoxy-4,4,5,5-tetramethyl-1,3,2-dioxaborolane. The reaction mixture was heated under reflux in a nitrogen atmosphere for about 4.5 hours at which time the theoretical amount of isopropanol, 15.0 grams, had been removed. The xylene was then removed from the resultant reaction mass by distillation at reduced pressure and 59.7 grams (94.7% yield) of 2-(2'-methyl-1',2',3',6'-tetrahydrobenzyloxy)-1,3,2-dioxaborolane, the desired cycloalkenyl glycol boric acid ester, was recovered from the reaction vessel. Chemical analysis of the product yielded the following datum.

Calculated for $C_{14}H_{25}BO_3$: B=4.29%. Found in product: B=4.38%.

III. Into a 500 ml. round-bottomed flask equipped with a magnetic stirrer and a reflux condenser and containing 200 ml. of toluene was placed 36.09 grams (0.1 mole) of 1,4,5,6,7,7-hexachloro-2,3-endo-di-(hydroxymethyl)-bicyclo[2.2.1]hept-5-ene and 31.60 grams (0.2 mole) of 2-methoxy-4,4,6-trimethyl-1,3,2-dioxaborinane. The reaction mixture was heated under reflux in a nitrogen atmosphere for about 5 hours at which time the theoretical amount of methanol, 6.4 grams, had been removed. The toluene was then removed from the resultant reaction mass by distillation at reduced pressure and 57.18 grams (93.3% yield) of 1,4,5,6,7,7-hexachloro-2,3-endo-di-[2'-(4',4',6'-trimethyl-1,3,2-dioxaborinanyloxy)methyl]bicyclo[2.2.1]hept-5-ene, the desired cycloalkenyl glycol diborate, was recovered from the reaction vessel. Chemical analysis of the product yielded the following datum.

Calculated for $C_{21}H_{30}B_2Cl_6O_6$: B=3.53%. Found in product: B=3.60%.

IV. Into a 500 ml. round-bottomed flask equipped with a magnetic stirrer and a reflux condenser and containing 200 ml. of xylene was placed 29.45 grams (0.3 mole) of 1,2,3,6-tetrahydrophenol and 64.24 grams (0.3 mole) of 2-n-butoxy-5-methyl-5-propyl-1,3,2-dioxaborinane. The reaction mixture was heated under reflux in a nitrogen atmosphere for about 5 hours at which time the theoretical amount, 22.2 grams, of n-butanol had been removed. The xylene was then removed from the resultant reaction mass by distillation at reduced pressure, and 68.45 grams (95.8% yield) of 2-(1',2',3',6'-tetrahydrophenoxy)-5-methyl-5-propyl-1,3,2-dioxaborinane, the desired cycloalkenyl glycol boric acid ester was recovered from the reaction vessel. Chemical analysis of the product yielded the following datum.

Calculated for $C_{13}H_{23}BO_3$: B=4.54%. Found in product: B=4.49%.

It is of interest to note that the cycloalkenyl glycol boric acid esters of the present invention are unsaturated compounds and that they can be used as dienophiles in further Diels-Alder reactions. In this manner it is possible to react any of the products of the present invention with a chlorinated conjugated diene such as hexachlorocyclopentadiene and prepare other organoboron compounds which are effective insecticides.

Other modes of applying the principles of the invention may be employed, change being made as regards the details described, provided the features stated in any of the following claims or the equivalent of such be employed.

We, therefore, particularly point out and distinctly claim as our invention:

1. A compound of a formula selected from the group consisting of

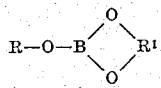

and

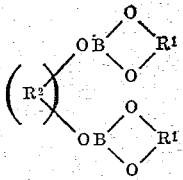

where
R is selected from the group consisting of tetrahydrobenzyl, lower alkyl substituted tetrahydrobenzyl, bicycloheptenyl, bicycloheptenylmethyl, and the chloro derivatives thereof;
$R^2$ is selected from the group consisting of bicycloheptenyl and bicycloheptenylmethyl radicals having two unsatisfied valences, and the chloro derivatives thereof; and
$R^1$ is an alkylene radical of from 2 to 3 carbon atoms in length and containing a total of from 2 to about 8 carbon atoms.

2. 2-exo-endo-[2'-(4',4',6'-trimethyl-1',3',2'-dioxaborinanyloxy)methyl]-bicyclo[2.2.1]hept-5-ene.

3. 2-(2'-methyl-1',2',3',6'-tetrahydrobenzyloxy)-1,3,2-dioxaborolane.

4. 1,4,5,6,7,7 - hexachloro - 2,3-endo-di-[2′-(4′,4′,6′-trimethyl - 1′,3′,2′ - dioxaborinanyloxy)methyl] - bicyclo[2.2.1]hept-5-ene.

References Cited by the Examiner

UNITED STATES PATENTS

| | | | |
|---|---|---|---|
| 2,839,564 | 6/58 | Garner | 260—462 |
| 2,940,839 | 6/60 | Garner | 260—462 |
| 2,948,597 | 8/60 | Belden | 260—462 |
| 3,078,296 | 2/63 | Bengelsdorf | 260—462 |

FOREIGN PATENTS 722,538  1/55  Great Britain.

OTHER REFERENCES

Thomas: "J. Chem. Soc.," 1946, pp. 823–824.

CHARLES B. PARKER, *Primary Examiner*.